United States Patent
Kanno et al.

(10) Patent No.: US 7,691,303 B2
(45) Date of Patent: Apr. 6, 2010

(54) METHOD AND APPARATUS FOR MANUFACTURING BASE MEMBER BEARING PROJECTIONS, AND BASE MEMBER BEARING PROJECTIONS

(75) Inventors: Masamichi Kanno, Fukuyama (JP); Sadayoshi Nakatsukasa, Fukuyama (JP); Kimio Yamaoka, Fukuyama (JP)

(73) Assignee: Hayakawa Rubber Company Limited, Hiroshima (JP)

( * ) Notice: Subject to any disclaimer, the term of this patent is extended or adjusted under 35 U.S.C. 154(b) by 703 days.

(21) Appl. No.: 11/528,240

(22) Filed: Sep. 28, 2006

(65) Prior Publication Data

US 2007/0163701 A1  Jul. 19, 2007

(30) Foreign Application Priority Data

Jan. 16, 2006 (JP) ............................. 2006-007432

(51) Int. Cl.
  *B29C 43/30* (2006.01)
  *B60N 3/04* (2006.01)
(52) U.S. Cl. .................. 264/172.19; 264/167; 156/242; 156/247; 156/290
(58) Field of Classification Search ................ 264/167, 264/171.13, 172.19, 173.1; 156/247, 248, 156/242, 245, 290
  See application file for complete search history.

(56) References Cited

FOREIGN PATENT DOCUMENTS

| JP | 2004-182042 | 7/2004 |
| JP | 2005-231399 | * 9/2005 |
| JP | 2005-313387 | 11/2005 |
| JP | 2005-324561 | 11/2005 |

OTHER PUBLICATIONS

English Machine Translation of JP2005-324561 (of record).*

* cited by examiner

*Primary Examiner*—Joseph S Del Sole
*Assistant Examiner*—Robert Dye
(74) *Attorney, Agent, or Firm*—Wenderoth, Lind & Ponack, L.L.P.

(57) ABSTRACT

A method is provided including a step of preparing a base member; a step of preparing a metal mold which comprises a reference surface and plural projection-shaping die parts which have ring-like protruding sections projecting from a reference surface and surrounding hollow spaces which are shaped to match with the profiles of the projections; a step of placing a thermoplastic or thermosetting sheet-like molding material on the base member; a step of pressing the metal mold against the molding material placed on the base member, pressurizing the molding material at least with the ring-like protruding sections and accordingly bonding the molding material thus pressurized with the ring-like protruding sections to the base member, and forming and shaping projections from the molding material which is opposed against the insides of the hollow spaces surrounded by the ring-like protruding sections; and a step of leaving on the base member the molding material which is opposed against the plural projection-shaping die parts and stripping off the molding material other than the molding material which is opposed against the plural projection-shaping die parts.

20 Claims, 10 Drawing Sheets

METHOD AND APPARATUS FOR MANUFACTURING BASE MEMBER BEARING PROJECTIONS, AND BASE MEMBER BEARING PROJECTIONS

FIELD OF THE INVENTION

The present invention relates to a method and an apparatus for manufacturing a projections-bearing base member in which plural projections are born in a spaced manner on a surface of the base member, and is favorably applicable, for example, to a method and an apparatus for manufacturing a floor mat. Also, the present invention relates to a projections-bearing base member manufactured by said method, and is favorably applicable, for example, to a floor mat manufactured by it.

BACKGROUND OF THE INVENTION

Figure 13:
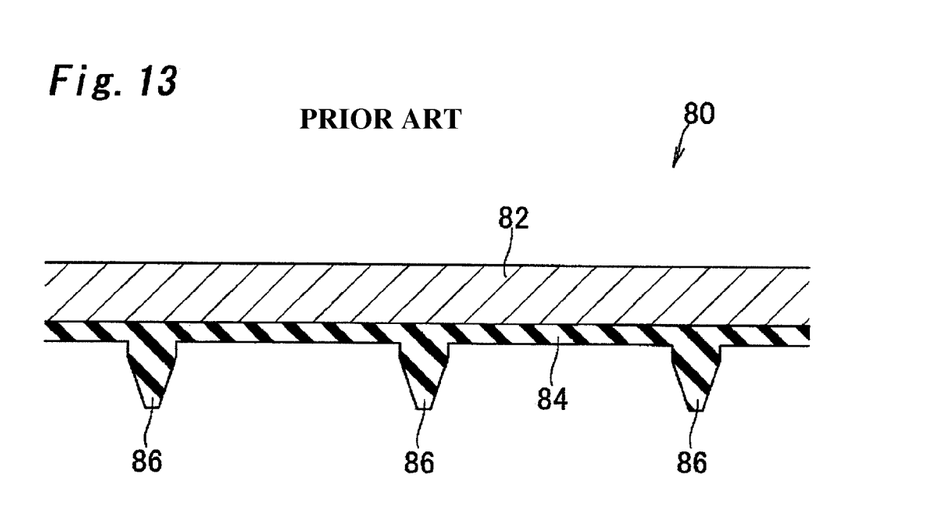
FIG. 13 is a cross sectional view which shows a conventional floor mat in which the entire back surface of a mat base member is covered with a resin sheet.

Among well known automotive floor mats is one in which the entire back surface of a mat base member 82 made of a fiber material is covered with a resin sheet 84 and the back surface of the resin sheet 84 seats non-slip projections 86 which project upright as shown in FIG. 13. A floor mat 80 having the non-slip projections 86 hardly gets displaced and will not obstruct safe driving.

During the manufacturing of the floor mat 80 shown in FIG. 13, at the stage of bonding the resin sheet 84 to the back surface of the mat base member 82, a thermoplastic resin extruded into the shape of a sheet and then softened by heat and the mat base member 82 get firmly pressed between a cylindrical mold roller, whose cylindrical surface has concaves having a shape which corresponds to the profile of the non-slip projections 86, and a cylindrical support roller, thereby bonding the mat base member 82 and the resin sheet 84 to each other and simultaneously forming and shaping the non-slip projections 86. Patent Publication JP 2005-313387 A describes such a structure in which paired cylindrical rollers firmly press a mat base member and a resin sheet against each other and accordingly bond them together under pressure and concurrently with the pressure bonding of the resin sheet and the mat base member, non-slip projections are formed and shaped.

However, since the entire back surface of the mat base member 82 is covered with the resin sheet 84 in the floor mat 80 manufactured by the manufacturing method described above as shown in FIG. 13, the resin sheet 84 reflects a sound coming through the surface of the floor mat 80, which is a disadvantage that the acoustic absorption capability of a car flooring material disposed beneath the floor mat 80 deteriorates and noises inside a vehicle are not reduced sufficiently.

Figure 14:
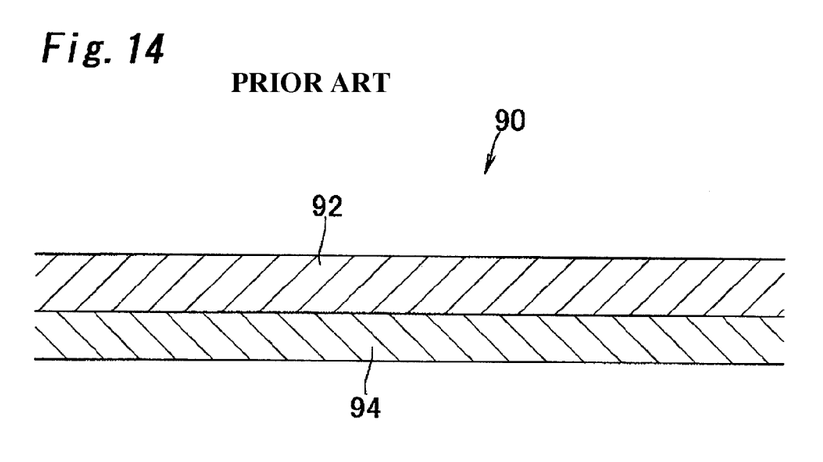
FIG. 14 is a cross sectional view which shows a conventional floor mat in which a sound absorbing material is bonded to the back surface of a mat base member.

A floor mat is known, as shown in FIG. 14, which prevents reflection of noises inside a vehicle in which instead of using a resin sheet, a sound absorbing material 94 is bonded to the back surface of a mat base member 92. This floor mat 90 however, due to the absence of non-slip projections on its back surface, easily gets displaced and could obstruct safe driving.

These problems have given rise to a demand for development of a floor mat whose back surface seats non-slip projections yet whose structure is capable of preventing reflection of in-vehicle noises coming through the surface of the mat. A specific structure of such a floor mat may be to provide spaced apart plural non-slip projections on the back surface of a mat base member. This should permit noises coming through the surface of the mat to be transmitted in the spaces between the non-slip projections, preventing reflection of the noises and obviating displacement of the mat.

However, when one attempts to form plural non-slip projections in a spaced arrangement on the back surface of a mat base member as described above, one can not use a conventional manufacturing technique which requires bonding a resin sheet to the entire back surface of the mat base member. This leads to a demand to newly develop a manufacturing technique for providing spaced plural projections on a surface of a mat base member while attaining an excellent production yield. Such a manufacturing technique can possibly be applied to manufacturing of other products than a floor mat.

SUMMARY OF THE INVENTION

Accordingly, an object of the present invention is to provide a method of and an apparatus for efficiently manufacturing a projections-seating base member, such as a floor mat, in which plural projections are spaced on a surface of the base member, and to provide the projections-seating base member manufactured by said method.

To solve the problems described above, a first aspect of the present invention is directed to a method of manufacturing a projections-seating base member according to which plural projections are formed in a spaced arrangement on a first surface or a second surface of a base member or on both the first surface and the second surface, including: a step of preparing the base member; a step of preparing a metal mold which includes a reference surface and plural projection-shaping die parts which have ring-like protruding sections projecting from the reference surface and surrounding hollow spaces which are shaped to match with the profiles of the projections; a step of placing a thermoplastic or thermosetting sheet-like molding material on the base member; a step of pressing the metal mold against the molding material placed on the base member, pressurizing the molding material at least with the ring-like protruding sections and accordingly bonding the molding material thus pressurized with the ring-like protruding sections to the base member, and forming and shaping projections from the molding material which is opposed against the insides of the hollow spaces surrounded by the ring-like protruding sections; and a step of leaving on the base member the molding material which is opposed against the plural projection-shaping die parts and stripping off the molding material other than the molding material which is opposed against the plural projection-shaping die parts.

Another aspect of the present invention is directed to an apparatus for manufacturing a projections-seating base member in which plural projections are formed in a spaced arrangement on a surface of the base member, including: a means which presses a metal mold, which includes a reference surface and plural projection-shaping die parts which have ring-like protruding sections projecting from the reference surface and surrounding hollow spaces which are shaped to match with the profiles of the projections, against a thermoplastic or thermosetting sheet-like molding material which is set on the surface of the base member, pressurizes the molding material at least with the ring-like protruding sections and accordingly bonds the molding material thus pressurized with the ring-like protruding sections to the base member, and forms and shapes the projections from the molding material which is opposed against the insides of the hollow spaces surrounded by the ring-like protruding sections; and a means which leaves on the base member the molding material which is opposed against the plural projection-shaping die parts and strips off the molding material other than the molding material which is opposed against the plural projection-shaping die parts.

Other aspect of the present invention is directed to an apparatus for manufacturing a projections-seating base member in which plural first projections and plural second projections are formed in a spaced arrangement respectively on a first surface and a second surface of the base member, including: a first molding means which presses a first metal mold, which includes a first reference surface and plural first projection-shaping die parts which have first ring-like protruding sections projecting from the first reference surface and surrounding first hollow spaces which are shaped to match with the profiles of the first projections, against a thermoplastic or thermosetting sheet-like molding material set on the first surface of the base member, pressurizes the molding material at least with the first ring-like protruding sections and accordingly bonds the molding material thus pressurized with the first ring-like protruding sections to the base member, and forms and shapes the first projections from the molding material which is opposed against the insides of the first hollow spaces surrounded by the first ring-like protruding sections; a second molding means which presses a second metal mold, which includes a second reference surface and plural second projection-shaping die parts which have second ring-like protruding sections projecting from the second reference surface and surrounding second hollow spaces which are shaped to match with the profiles of the second projections, against a thermoplastic or thermosetting sheet-like molding material set on the second surface of the base member, pressurizes the molding material at least with the second ring-like protruding sections and accordingly bonds the molding material thus pressurized with the second ring-like protruding sections to the base member, and forms and shapes the second projections from the molding material which is opposed against the insides of the second hollow spaces surrounded by the second ring-like protruding sections; a first strip-off means which leaves on the first surface of the base member the molding material which is opposed against the plural first projection-shaping die parts and strips off the molding material other than the molding material which is opposed against the plural first projection-shaping die parts; and a second strip-off means which leaves on the second surface of the base member the molding material which is opposed against the plural second projection-shaping die parts and strips off the molding material other than the molding material which is opposed against the plural second projection-shaping die parts.

Other aspect of the present invention is directed to a projections-seating base member manufactured by said method.

According to the present invention, with the sheet-like molding material placed on the base member, the ring-like protruding sections of the plural projection-shaping die parts projecting from the reference surface of the metal mold press the molding material, thereby bonding the molding material pressurized by the ring-like protruding sections to the base member and forming and shaping the projections from the molding material opposed against the insides of the hollow spaces surrounded by the ring-like protruding sections, the molding material opposed against the projection-shaping die parts is thereafter left on the base member while stripping off the molding material exclusive of the molding material opposed against the projection-shaping die parts, whereby the projections-seating base member in which the plural projections are provided in a spaced manner on the surface of the base member is efficiently manufactured.

Further, since the projections are provided in a spaced manner on the surface of the base member and the surface of the base member is not covered with a resin or the like in the projections-seating base member manufactured according to the present invention, the base member can favorably transmit a sound where the base member is formed by a breathable material which may be a fiber material or the like. Hence, in the event that an automotive floor mat is manufactured in which non-slip projections are provided in a spaced manner on the back surface of a mat base member in accordance with the present invention, since in-vehicle noises coming through the surface of the mat base member are favorably transmitted by the mat base member and in the spaces between the non-slip projections which are formed on the back surface of the mat base member, a car flooring material which is disposed beneath the floor mat can effectively exhibit its acoustic absorption capability and the quietness inside a vehicle can be enhanced.

Further, since the molding material exclusive of the molding material left on the base member is stripped off without cutting the same according to the present invention, it is not necessary to use any apparatus for or any step of cutting the molding material and it is therefore possible to reduce the manufacturing cost.

DETAILED DESCRIPTION OF THE PREFERRED EMBODIMENTS

The first preferred embodiment of the present invention will now be described with reference to FIGS. 1 through 6. While the following will describe manufacturing of an automotive floor mat having non-slip projections in relation to the first preferred embodiment, the present invention is not limited to manufacturing of an automotive floor mat but is applicable also to manufacturing of other projections-seating base members. In this context, a "projections-seating base member" is a base member in which plural projections are formed in a spaced arrangement on a surface of the base member. Fields where other "projections-bearing base members" than floor mats are used include for example an architecture-related field which uses members such as floors, ceilings and walls, an automotive field which uses members such as in-vehicle ceiling members and sound absorbing materials of top panels of engine rooms, civil engineering-related field which uses members such as sound abatement shields along roads and sound absorbing materials for engineering works, and general industries which use members for sound source generators, which may be around engine motors, for general industrial applications.

Figure 5:
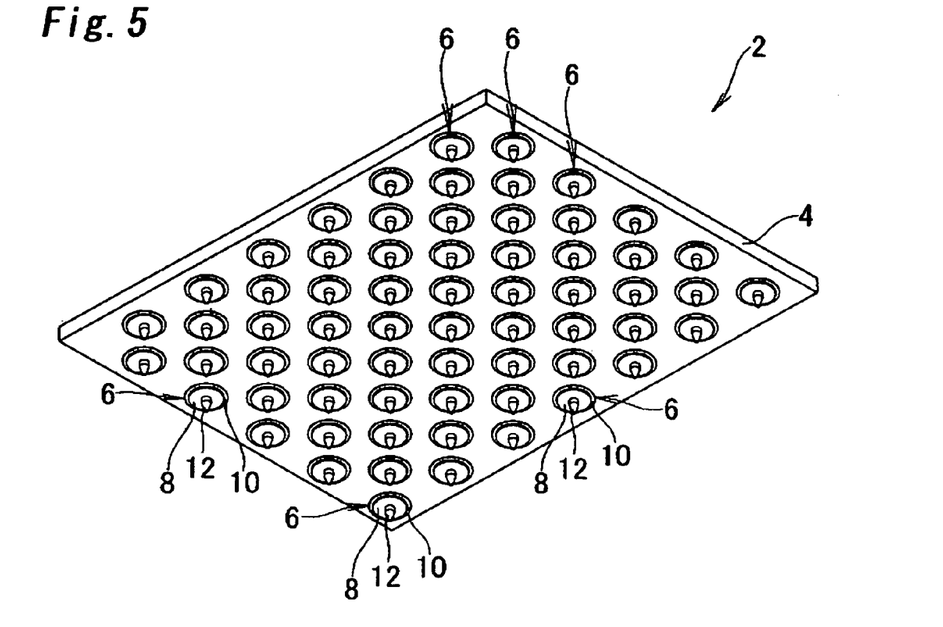
FIG. 5 is a perspective view of a floor mat.
Figure 6:
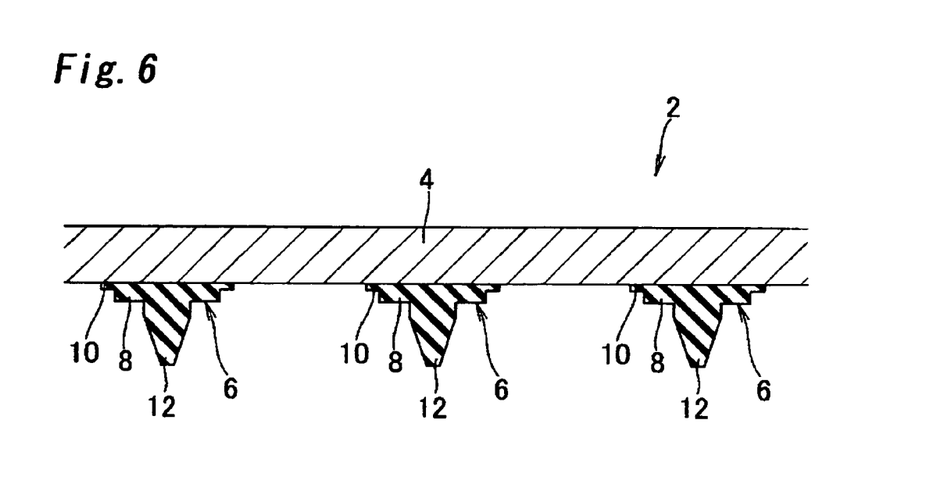
FIG. 6 is a cross sectional view of a floor mat.

A floor mat 2 shown in FIGS. 5 and 6 is formed by a mat base member 4 and numerous non-slip projections 6 which are bonded to the back surface of the mat base member 4.

The mat base member 4 is made of a breathable material which may specifically be a fiber material. The fiber material may be for instance a carpet, or alternatively, a sound absorbing material of non-woven fabric or felt. The fiber material may otherwise be formed by multiple layers, e.g., by a carpet layer and a sound absorbing material layer which are stacked one atop the other. As the raw materials of the fiber material, at least one type of a natural fiber or a synthetic fiber, types of which are not limited in any particular sense, is used.

The material of the non-slip projections 6 may be a thermoplastic material or a thermosetting material, namely, a resin or rubber. A thermoplastic elastomer is preferable as a thermoplastic material, while rubber or rubber foam is preferable as a thermosetting material. The raw material of the non-slip projections 6 may be any one of a synthetic resin, a natural resin, a regenerated resin, synthetic rubber, natural rubber and regenerated rubber. Further, the non-slip projections 6 are made by appropriately blending to the raw material above an age resistor, a reinforcing agent, a filler, a flexibilizer or other chemical in accordance with a demanded functionality.

While the non-slip projections 6 are shaped like circles as viewed from the back surface of the floor mat 2, the shape of the non-slip projections 6 is not limited to a circular shape but may be any desired shape. In addition, the non-slip projections 6 include base sections 8 shaped like disks for instance and having a predetermined thickness, fringe sections 10 around the outer circumferences of the base sections 8 and protruding sections 12 which project from the center of the base sections 8. The fringe sections 10 of the non-slip projections 6 are thinner than the base sections 8. The protruding sections 12 of the non-slip projections 6 are shaped approximately like circular cones whose diameters are progressively narrower toward the tips. The height of the protruding sections 12 is 1 through 5 mm for instance.

The non-slip projections 6 are provided in a spaced-apart manner on the back surface of the floor mat 2, i.e., arranged apart from each other by predetermined pitches in a lattice pattern. The pitches of the non-slip projections 6 are 5 through 200 mm for example. Further, the non-slip projections 6 and the mat base member 4 are bonded to each other in surface areas of 5 through 150 $mm^2$ each for instance.

Since the non-slip projections 6 are formed in a spaced arrangement on the back surface of the mat base member 4 of the floor mat 2, in-vehicle noises coming through the surface of the mat base member 4 are favorably transmitted by the mat base member 4 and in the spaces between the non-slip projections 6 which are formed on the back surface of the mat base member 4, which allows a car flooring material disposed beneath the floor mat 2 to exhibit its acoustic absorption capability effectively. The non-slip projections 6 may merely be provided on the mat base member 4, if not located apart from each other by predetermined pitches in a lattice pattern.

Figure 1:
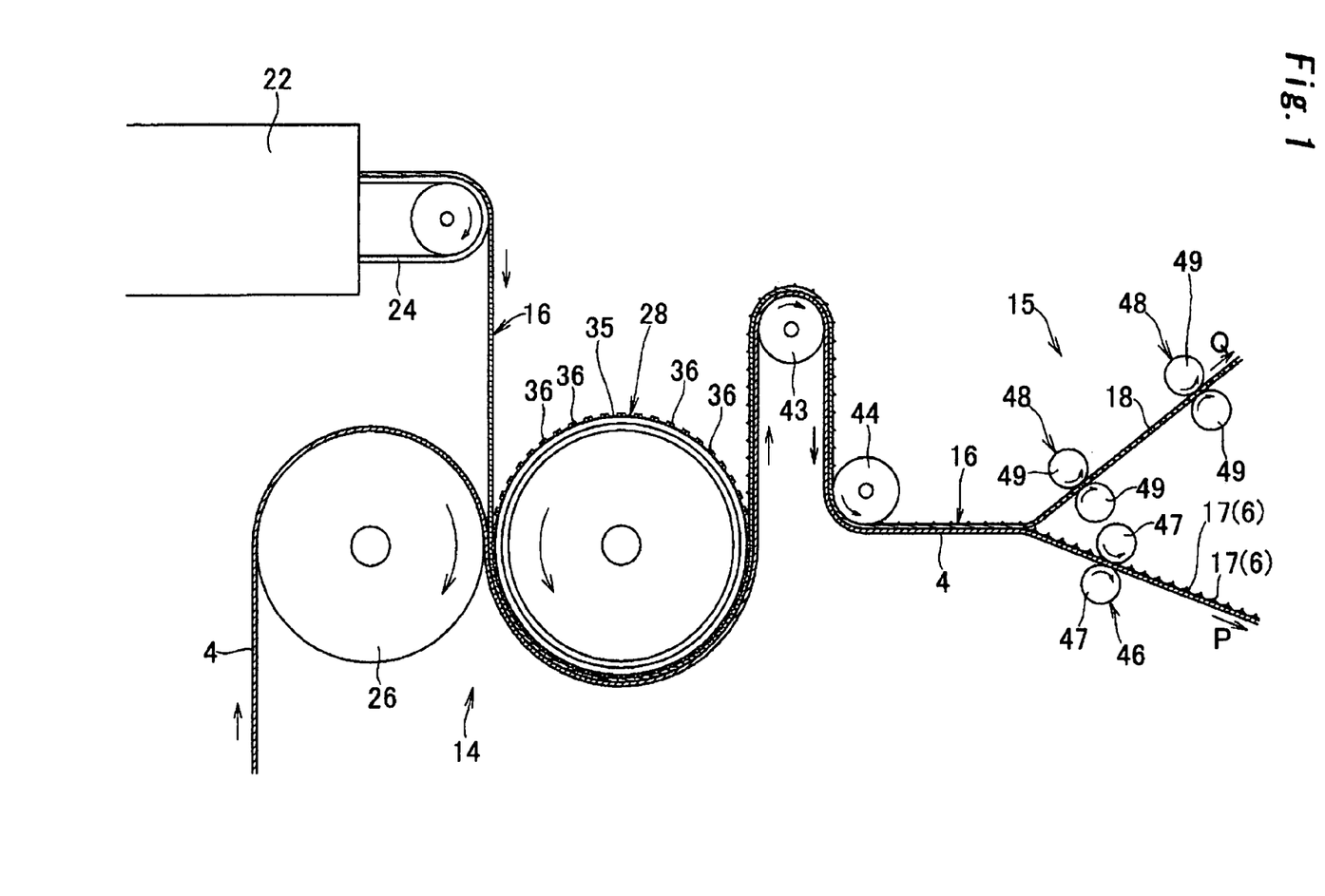
FIG. 1 is a diagram which shows a floor mat manufacturing apparatus according to a first preferred embodiment.

As shown in FIG. 1, the manufacturing apparatus for manufacturing the floor mat 2 includes a means 14 which bonds a thermoplastic or thermosetting sheet-like molding material 16 to the mat base member 4 and forms and shapes the non-slip projections 6 from a molding material 17 which is a part of the molding material 16 and will be described later and a means 15 which strips off a molding material 18 which is exclusive of this partial molding material 17, leaving the partial molding material 17 on the mat base member 4.

The means 14 which forms and shapes the non-slip projections 6 described above includes a cylindrical mold roller 28, which serves as a metal mold and has a cylindrical surface 35, namely, a reference surface, and plural projection-shaping die parts 36 projecting from the cylindrical surface 35, and a cylindrical support roller 26 serving as a support member which firmly presses, together with the cylindrical mold roller 28, the mat base member 4 and the molding material 16. The cylindrical support roller 26 is disposed opposed against the cylindrical mold roller 28.

Figure 2:
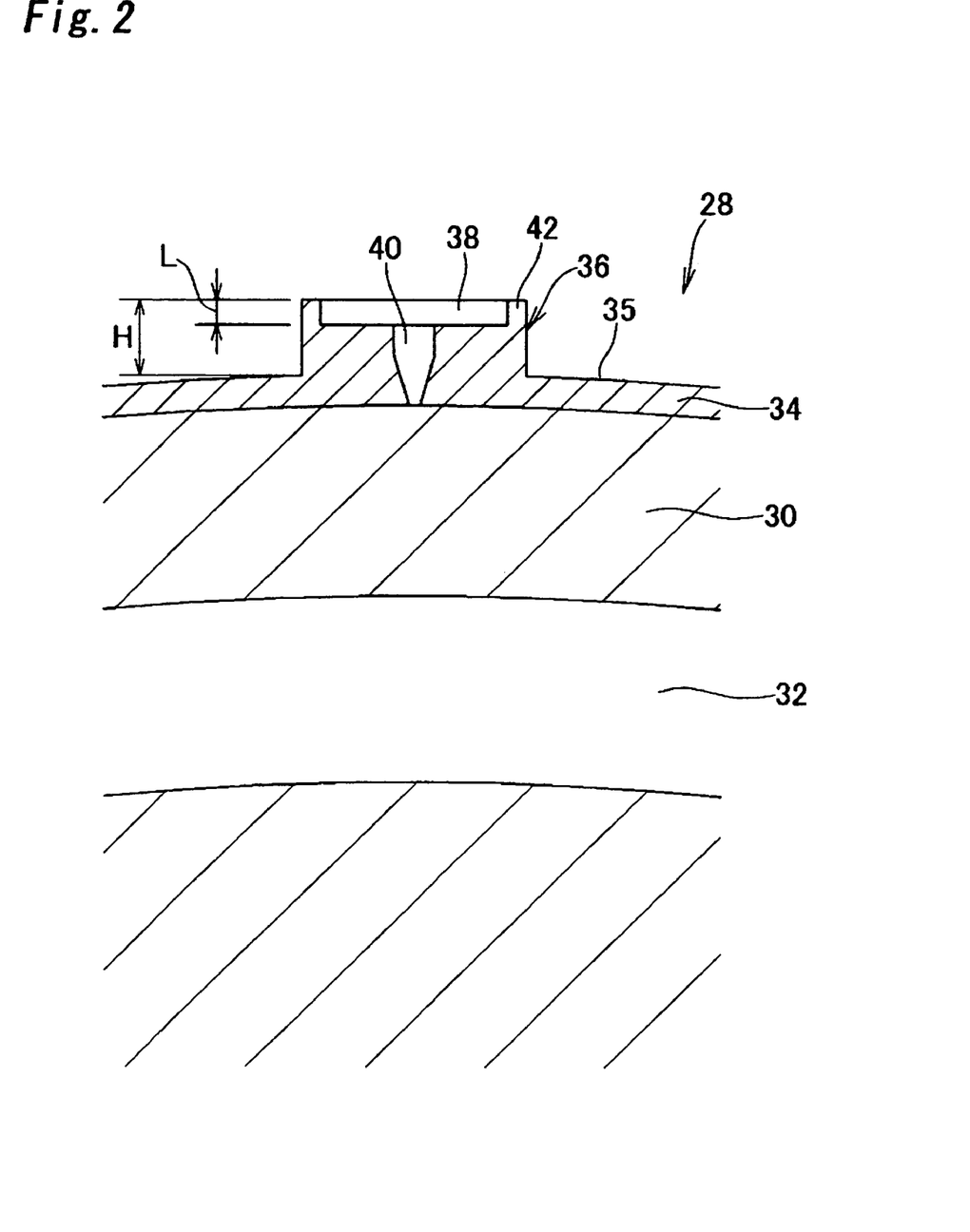
FIG. 2 is an enlarged cross sectional view of a projection-shaping die part of a cylindrical mold roller.

As shown in FIG. 2, a front layer 30 of the cylindrical mold roller 28 is coated with a metal mold layer 34 which has a predetermined thickness. Meanwhile, there is a cooling water passage 32 inside the front layer 30. The cooling water passage 32 carries cooling water which cools the metal mold layer 34.

The plural projection-shaping die parts 36 mentioned above are formed protruding from the cylindrical surface of the cylindrical mold roller 28, namely, the outer surface 35 of the metal mold layer 34, outward along the diameter direction. On the outer surface 35 of the metal mold layer 34, the plural projection-shaping die parts 36 are located apart from each other by pitches of 5 through 20 mm for instance in a lattice pattern so as to match with the locations of the non-slip projections 6 which are formed on the back surface of the mat base member 4.

The projection-shaping die parts 36 include hollow spaces 38 which are shaped so as to fit with the profiles of the non-slip projections 6 and ring-like protruding sections 42 which surround the hollow spaces 38. The hollow spaces 38 have the shapes which correspond to the shapes of the base sections 8 of the non-slip projections 6, and define concaves of circular shapes for instance having a predetermined depth.

The bottom surfaces of the hollow spaces 38 have protruding section molding holes 40 whose shapes correspond to the shapes of the protruding sections 12 of the non-slip projections 6. So as to be comparable with the height of the protruding sections 12 of the non-slip projections 6, the depth of the protruding section molding holes 40 is set to 1 through 5 mm for instance. The protruding section molding holes 40 penetrate the metal mold layer 34, and link to a very narrow clearance between the metal mold layer 34 and the front layer 30.

The ring-like protruding sections 42 have the shapes which fit with the shapes of the fringe sections 10 of the non-slip projections 6, and are shaped like rings for example as viewed from the outer side along the diameter direction of the cylindrical mold roller 28. So as to be comparable with the surface areas where the non-slip projections 6 and the mat base member 4 are adhered to each other, the area sizes of sections surrounded by the outer edges at the tips of the ring-like protruding sections 42 are set to 5 through 150 mm$^2$ for instance.

Figure 3:
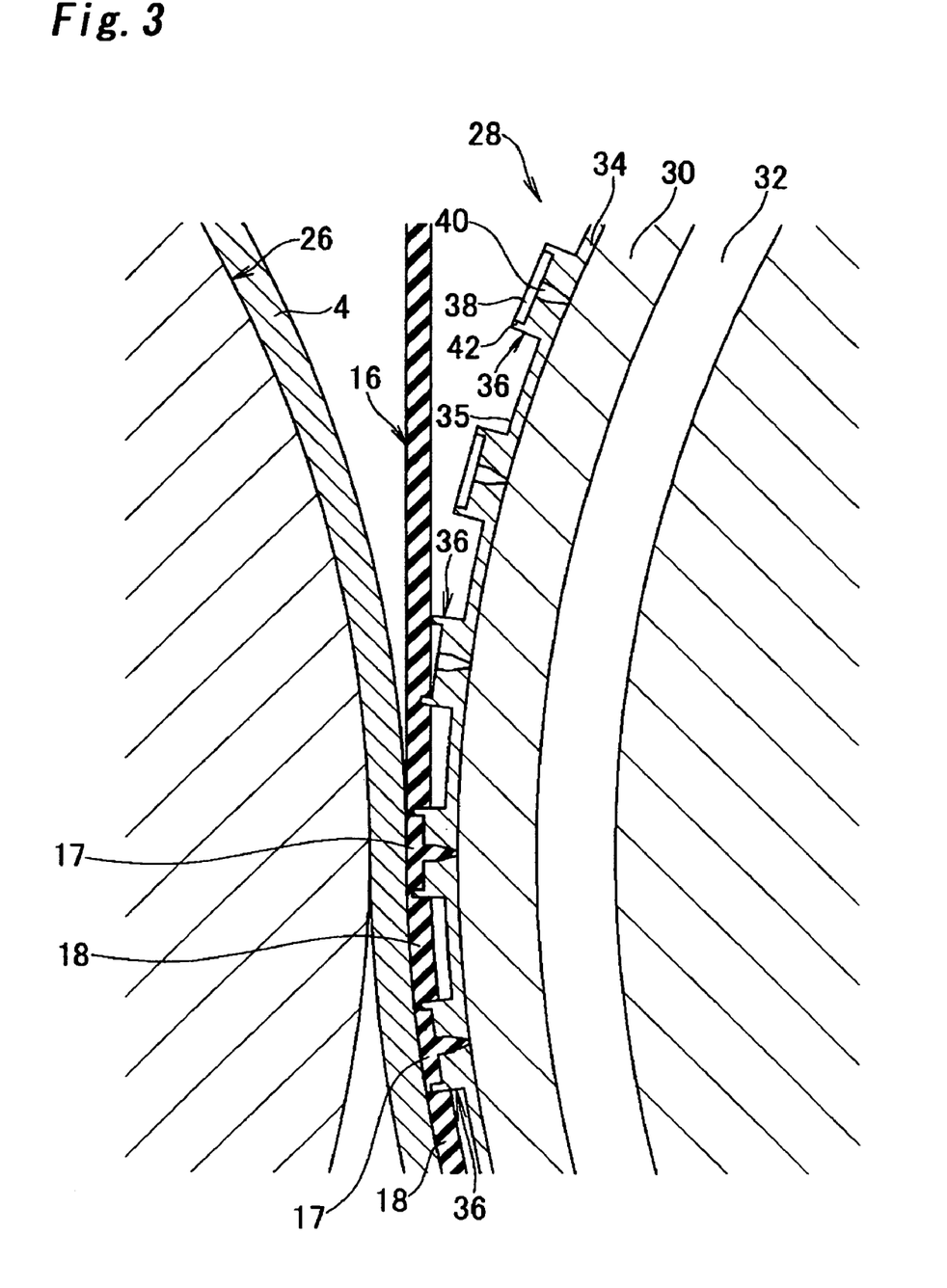
FIG. 3 is a cross sectional view which shows a section in which a molding material is pressure bonded to a mat base member.

The height H of the projection-shaping die parts 36 is set to be equal to or beyond the thickness of the molding material 16. Due to this, the molding material 16 inserted, as it is set on the mat base member 4, into between the cylindrical mold roller 28 and the cylindrical support roller 26 gets pressed at least by the ring-like protruding sections 42 of the projection-shaping die parts 36 but does not get pressed on the outer surface 35 of the metal mold layer 34 as shown in FIG. 3. The molding material 16 pressed by the ring-like protruding sections 42 consequently adheres to the mat base member 4, whereby the molding material 17 opposed against the projection-shaping die parts 36 is fixed to the mat base member 4 and the molding material 18 exclusive of the molding material 17 which is opposed against the projection-shaping die parts 36 simply lies on the mat base member 4 without getting fixed to the mat base member 4.

The height H of the projection-shaping die parts 36 however needs not always be equal to or beyond the thickness of the molding material 16, but may instead be smaller than the thickness of the molding material 16 as long as high enough to prohibit the molding material 18, which is exclusive of the molding material 17 opposed against the projection-shaping die parts 36, from bonding to the mat base member 4 or to permit the molding material 18 to adhere only with a very weak adhesive strength which is so small to easily peel the molding material 18 off.

The height L of the ring-like protruding sections 42 is set smaller than the thickness of the molding material 16 so that it is possible to introduce the molding material 16, which is opposed against the insides of the hollow spaces 38 surrounded by the ring-like protruding sections 42, into the hollow spaces 38 and the protruding section molding holes 40. This prevents defective molding of the base sections 8 and the protruding sections 12 of the non-slip projections 6.

The strip-off means 15 described earlier includes, as shown in FIG. 1, a first means 46 which pulls the mat base member 4, to which the molding material 17 opposed against the plural projection-shaping die parts 36 has been bonded, toward a first direction P and a second means 48 which pulls the molding material 18, which is exclusive of the molding material 17 opposed against the plural projection-shaping die parts 36, toward a second direction Q which is different from the first direction P.

The first means 46 is formed by paired cylindrical rollers 47 which are opposed against each other, and has such a structure that as the paired cylindrical rollers 47 rotate while firmly holding in between the mat base member 4 to which the molding material 17 opposed against the plural projection-shaping die parts 36 has been bonded, the mat base member 4 nipped between the cylindrical rollers 47 is transported as it is pulled toward the first direction P.

The second means 48 is formed by paired cylindrical rollers 49 which are opposed against each other, and has such a structure that as the paired cylindrical rollers 49 rotate while firmly holding in between the molding material 18 which is exclusive of the molding material 17 opposed against the plural projection-shaping die parts 36, the molding material 18 nipped between the cylindrical rollers 49 is transported as it is pulled toward the second direction Q.

The first means 46 and the second means 48 do not always have to be the paired cylindrical rollers 47 and 49, but may instead be any means which are capable of pulling sheet-like members toward predetermined directions.

A method of manufacturing the floor mat 2 will now be described with reference to FIG. 1. After shaped into a sheet whose thickness is from 0.5 to 3 mm for example by an extrusion machine not shown, the molding material 16 by which the non-slip projections 6 are formed is heated and accordingly softened in a heating furnace 22, and then transported by a heating furnace conveyer 24 toward the downstream side of a transportation path. The molding material 16 supplied from the heating furnace conveyer 24 is inserted into between the cylindrical support roller 26 and the cylindrical mold roller 28 which are opposed against each other below the downstream-side end of the heating furnace conveyer 24.

Meanwhile, the mat base member 4, after being transported as it is wound around a part of the outer circumferences of the cylindrical support roller 26 so that its back surface is faced outside, is fed into between the cylindrical support roller 26 and the cylindrical mold roller 28. This places the molding material 16 on the back surface of the mat base member 4, and makes the cylindrical mold roller 28 press on these two which are held between the cylindrical mold roller 28 and the cylindrical support roller 26.

At this stage, at least the ring-like protruding sections 42 of the projection-shaping die parts 36 press the molding material 16 as shown in FIG. 3, thereby bonding the molding material 16 pressed by the ring-like protruding sections 42 to the mat base member 4 and forming and shaping the non-slip projections 6 from the molding material 16 which is opposed against the insides of the hollow spaces 38 surrounded by the ring-like protruding sections 42.

As the molding material 16 pressed by the ring-like protruding sections 42 adheres to the mat base member 4, the molding material 17 opposed against the projection-shaping die parts 36 is fixed to the mat base member 4. On the contrary, the outer surface 35 of the metal mold layer 34 does not press the molding material 16, so that the molding material 18 which is exclusive of the molding material 17 opposed against the plural projection-shaping die parts 36 simply lies on the mat base member 4 without getting fixed to the mat base member 4.

However, this does not necessarily prevent the outer surface 35 of the metal mold layer 34 from pressing the molding material 16 with very weak force, in which case the molding material 18, which is exclusive of the molding material 17 opposed against the projection-shaping die parts 36, may be prevented from bonding to the mat base member 4 or the molding material 18 may adhere only with a weak enough adhesive strength to get easily stripped off.

While the molding material 17 opposed against the projection-shaping die parts 36 is fixed to the mat base member 4 and the molding material 18 which is exclusive of the molding material 17 opposed against the projection-shaping die parts 36 is not fixed to the mat base member 4 as described above, the molding material 17 fixed to the mat base member 4 and the molding material 18 not fixed to the mat base member 4 are contiguous to each other without a break.

Forming and shaping of the non-slip projections 6 takes place concurrently with bonding of the molding material 16 to the mat base member 4. In other words, during pressing of the molding material 16 with the ring-like protruding sections 42, the molding material 16 opposed against the insides of the hollow spaces 38 surrounded by the ring-like protruding sections 42 fills up the hollow spaces 38 and the protruding section molding holes 40, thereby forming and shaping the base sections 8 and the protruding sections 12 of the non-slip projections 6. In addition, as the molding material 16 opposed against the ring-like protruding sections 42 gets compressed by the pressure applied by the ring-like protruding sections 42 and accordingly becomes thin, whereby the fringe sections 10 of the non-slip projections 6 are formed and shaped.

At this stage, the ring-like protruding sections 42 press the fringe sections of the molding material 17 opposed against the projection-shaping die parts 36, which prevents overflowing of the molding material 17 opposed against the projection-shaping die parts 36 and secures bonding of the molding material 17 to the mat base member 4 and forming and shaping of the non-slip projections 6.

Further, since the protruding section molding holes 40 penetrate the metal mold layer 34, even if gas is generated during forming and shaping of the non-slip projections 6, the gas will escape from the very narrow clearance between the metal mold layer 34 and the front layer 30, thereby preventing the gas from staying inside the protruding section molding holes 40 and obviating defective forming and shaping of the non-slip projections 6.

Still further, since the molding material 16 is heated and accordingly softened before laid on the mat base member 4, use of a thermoplastic material as the molding material 16 ensures excellent bonding to the mat base member 4 and excellent forming and shaping of the non-slip projections 6. The molding material 16 may be heated and accordingly softened after placed on the mat base member 4, in which case the molding material 16 may be formed and shaped by the projection-shaping die parts 36 while at the same time heated.

The mat base member 4 and the molding material 16 adhered to each other under pressure in the manner described above are wound around the cylindrical mold roller 28, and as the cylindrical mold roller 28 rotates, transported toward the downstream side of the transportation path. In a state that the mat base member 4 and the molding material 16 are wound around the cylindrical mold roller 28, the metal mold layer 34 cooled by the cooling water flowing through the cooling water passage 32 cools and hardens the molding material 16. The molding material 16 thus cooled and hardened can easily fall off from the metal mold layer 34 of the cylindrical mold roller 28, and is smoothly transported toward the downstream side of the transportation path. However, the step of cooling the molding material 16 with the cooling water is not indispensable.

Figure 4:
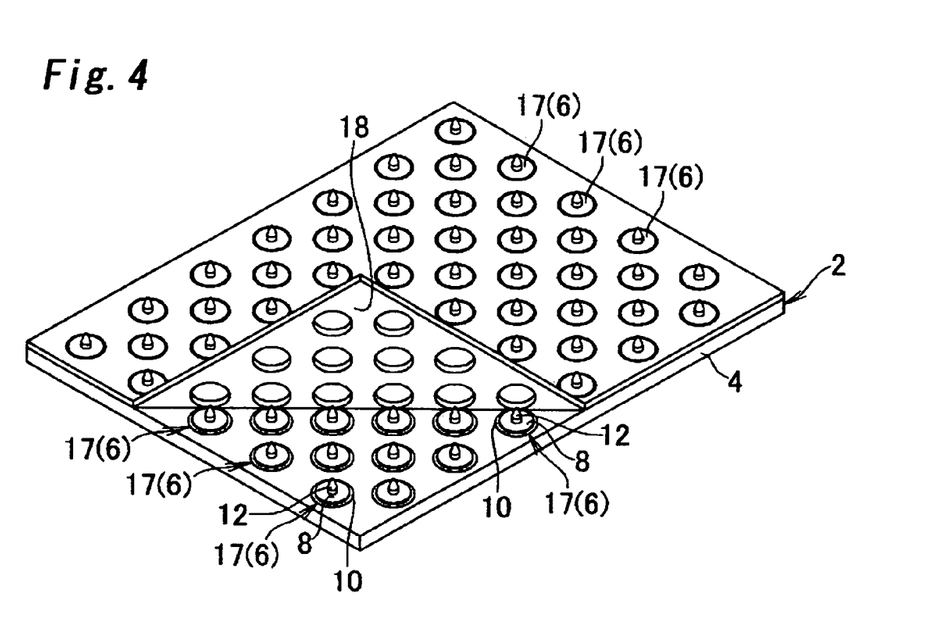
FIG. 4 is a perspective view which shows a state that the molding material, except for where it is opposed against the projection-shaping die parts, is being stripped off from the mat base member.

After transportation of the mat base member 4 and the molding material 16, which are stacked one atop the other, further toward the downstream side by transportation rollers 43 and 44, the first means 46 pulls the mat base member 4, to which the molding material 17 opposed against the plural projection-shaping die parts 36 has been bonded, toward the first direction P and the second means 48 pulls the molding material 18, which is exclusive of the molding material 17 opposed against the plural projection-shaping die parts 36, toward the second direction Q. In consequence, the molding material 17 opposed against the plural projection-shaping die parts 36 is left on the mat base member 4 while the molding material 18 exclusive of the molding material 17 opposed against the plural projection-shaping die parts 36 is stripped off as shown in FIG. 4.

In this manner, the floor mat 2 in which the plural non-slip projections 6 are formed in a spaced arrangement on the back surface of the mat base member 4 is obtained. Meanwhile, the molding material 18 thus stripped off can be recycled over and over again, which reduces the material cost.

According to the first preferred embodiment, since the mat base member 4 and the molding material 16 are transported from the upstream side to the downstream side of the transportation path as the cylindrical mold roller 28 and the cylindrical support roller 26 rotate, it is possible to continuously manufacture the floor mats 2 and reduce the manufacturing cost.

In the event that the mat base member 4 is to be formed by multiple layers, after inserting only some of the layers of the mat base member 4 between the cylindrical support roller 26 and the cylindrical mold roller 28 and bonding the non-slip projections 6 on the surface on one side of these layers of the mat base member 4, the remaining layers of the mat base member 4 may be stacked one atop the other by bonding or otherwise appropriately on the other side of the earlier layers. For instance, where the mat base member 4 is formed by a carpet layer and a sound absorbing material layer, the sound absorbing material layer alone of the mat base member 4 may be inserted between the cylindrical support roller 26 and the cylindrical mold roller 28, the non-slip projections 6 may be then bonded to the surface on one side of the sound absorbing material layer, and the carpet layer may thereafter be bonded to the surface on the other side of the sound absorbing material layer.

Figure 7:
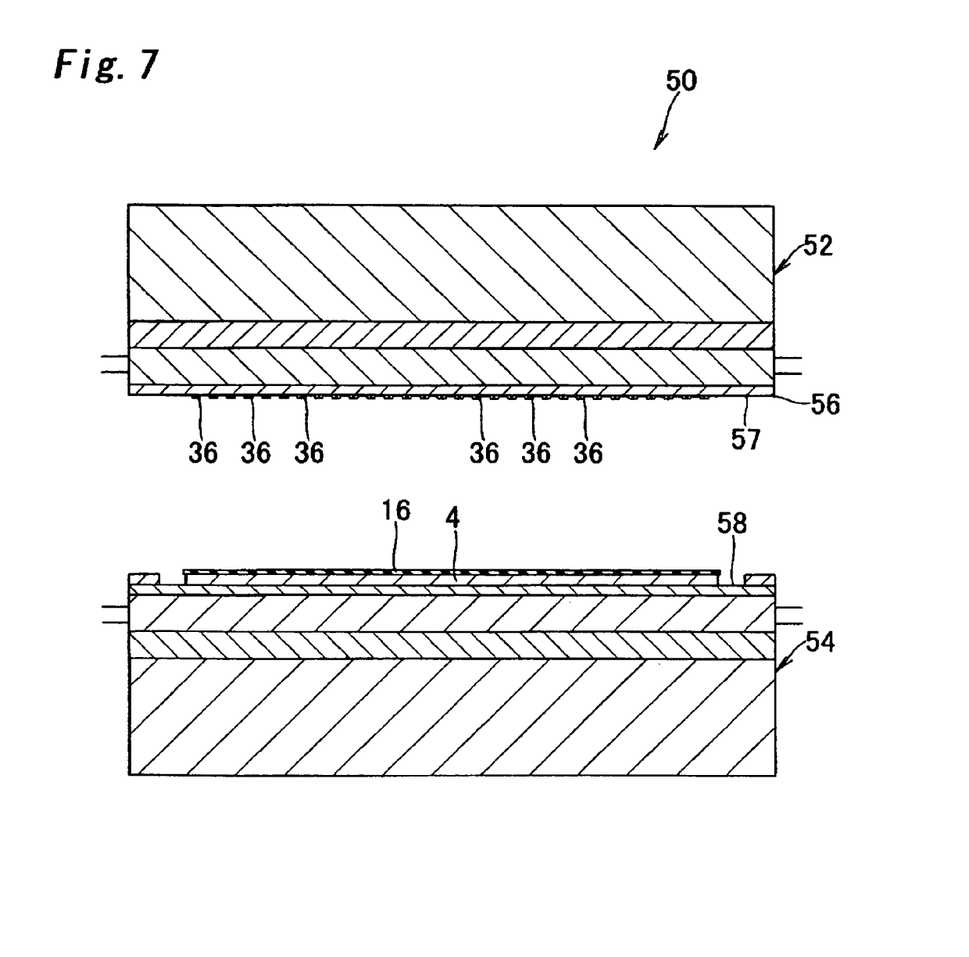
FIG. 7 is a cross sectional view of a press machine which is used for a floor mat manufacturing method according to a second preferred embodiment.
Figure 8A:
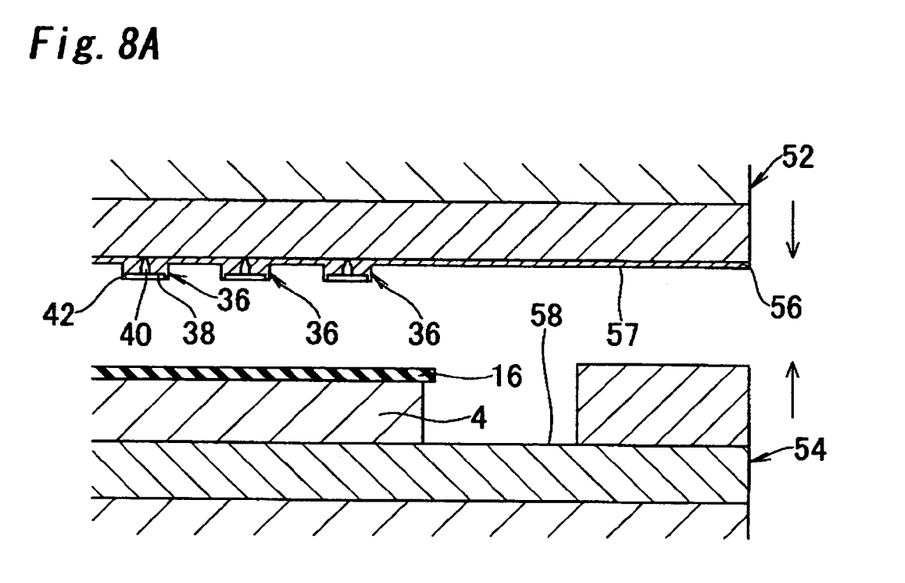
FIGS. 8A and 8B are enlarged cross sectional views, each of which shows a state that the molding material is being pressure bonded to the mat base member using the press machine which is shown in FIG. 7.
Figure 8B:
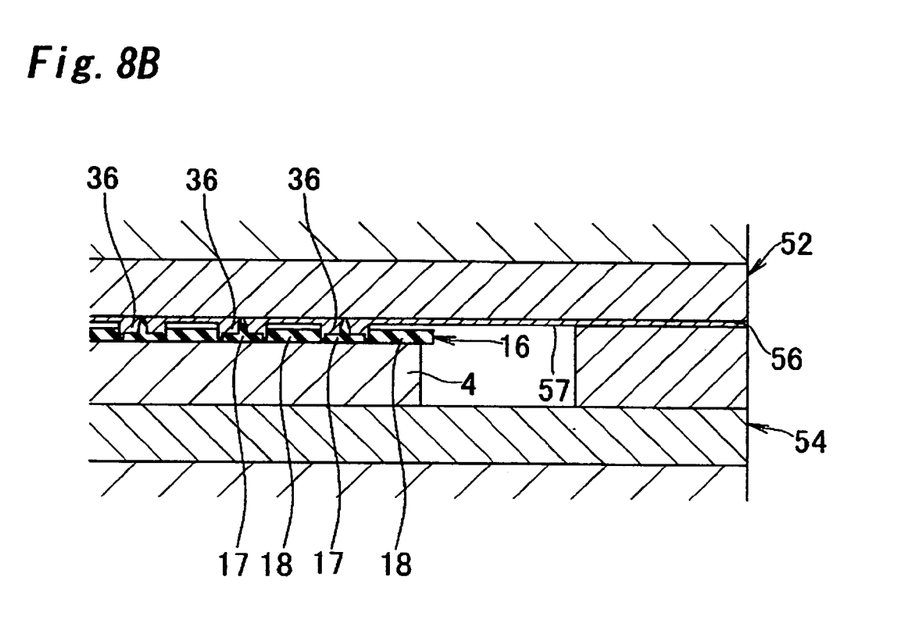

FIGS. 7, 8A and 8B show the second preferred embodiment of the present invention. The second preferred embodiment is directed to a method of manufacturing a floor mat which uses a press machine 50, and in this preferred embodiment as well, the mat base member 4 and the sheet-like molding material 16 pressure bonded to each other and the non-slip projections 6 are formed and shaped from the molding material 16, thereby manufacturing the floor mat 2 which has the same structure as that according to the first preferred embodiment.

The press machine 50 includes an upper press section 52, which serves as a metal mold and has a reference surface 57 and the plural projection-shaping die parts 36 projecting from the reference surface 57, and a lower press section 54 which functions as a support member which firmly presses, together with the upper press section 52, the mat base member 4 and the molding material 16.

The bottom surface of the upper press section 52 is formed by a metal mold layer 56 which has the plural projection-shaping die parts 36. The projection-shaping die parts 36 are formed, apart from each other by predetermined gaps along the horizontal direction, on the front surface of the metal mold layer 56, namely, the bottom surface of the upper press section 52. The top surface of the lower press section 54 acts as a horizontal mounting surface 58 which mounts an article to be pressed by the press machine 50.

For pressure bonding using the press machine 50 described above and forming and shaping of the non-slip projections 6, the mat base member 4 and the molding material 16 are mounted on the mounting surface 58 of the lower press section 54 such that the molding material 16 is laid on the mat base member 4. This is followed by closing of the press machine 50, pressurization with a predetermined pressure and heating at a predetermined temperature for a predetermined period of time, thereby performing simultaneously pressure bonding of the mat base member 4 and the molding material 16 and forming and shaping of the non-slip projections 6. The molding material 16 may be preliminarily heated before laid on the mat base member 4.

In the state that the press machine 50 is close, as shown in FIG. 8(*b*), the upper press section 52 presses upon the molding material 16 which is laid on the mat base member 4 and therefore at least the ring-like protruding sections 42 of the projection-shaping die parts 36 press the molding material 16, which bonds thus pressurized molding material 16 to the mat base member 4 and forms and shapes the non-slip projections 6 from the molding material 16 which is opposed against the insides of the hollow spaces 38 surrounded by the ring-like protruding sections 42.

As the molding material 16 pressed by the ring-like protruding sections 42 adheres to the mat base member 4, the molding material 17 opposed against the projection-shaping die parts 36 is fixed to the mat base member 4. Meanwhile, the molding material 18 exclusive of the molding material 17 which is opposed against the projection-shaping die parts 36 simply lies on the mat base member 4 without getting fixed to the mat base member 4. At this stage, the molding material 17 fixed to the mat base member 4 and the molding material 18 not fixed to the mat base member 4 are contiguous to each other without a break.

Further, during pressing of the molding material 16 with the ring-like protruding sections 42, the molding material 16 opposed against the insides of the hollow spaces 38 surrounded by the ring-like protruding sections 42 fills up the hollow spaces 38 and the protruding section molding holes 40, thereby forming and shaping the base sections 8 and the protruding sections 12 of the non-slip projections 6. In addition, as the molding material 16 opposed against the ring-like protruding sections 42 gets compressed by the pressure applied by the ring-like protruding sections 42 and accordingly becomes thin, whereby the fringe sections 10 of the non-slip projections 6 are formed and shaped.

After this, the mat base member 4 and the molding material 16 are taken out from the press machine 50 and the molding material 18 exclusive of the molding material 17 which is opposed against the plural projection-shaping die parts 36 is stripped off, whereby the floor mat 2 in which the plural non-slip projections 6 are formed in a spaced arrangement on the back surface of the mat base member 4 is obtained as in the first preferred embodiment.

The other structures and effects according to the second preferred embodiment are similar to those according to the first preferred embodiment, and therefore, in FIGS. 7 and 8, those members having similar functions to those according to the first preferred embodiment are denoted at the same reference symbols. In addition, while the foregoing has described the second preferred embodiment in relation to a method of manufacturing an automotive floor mat, the second preferred embodiment is applicable also to manufacturing of other projections-seating base members.

Figure 9:
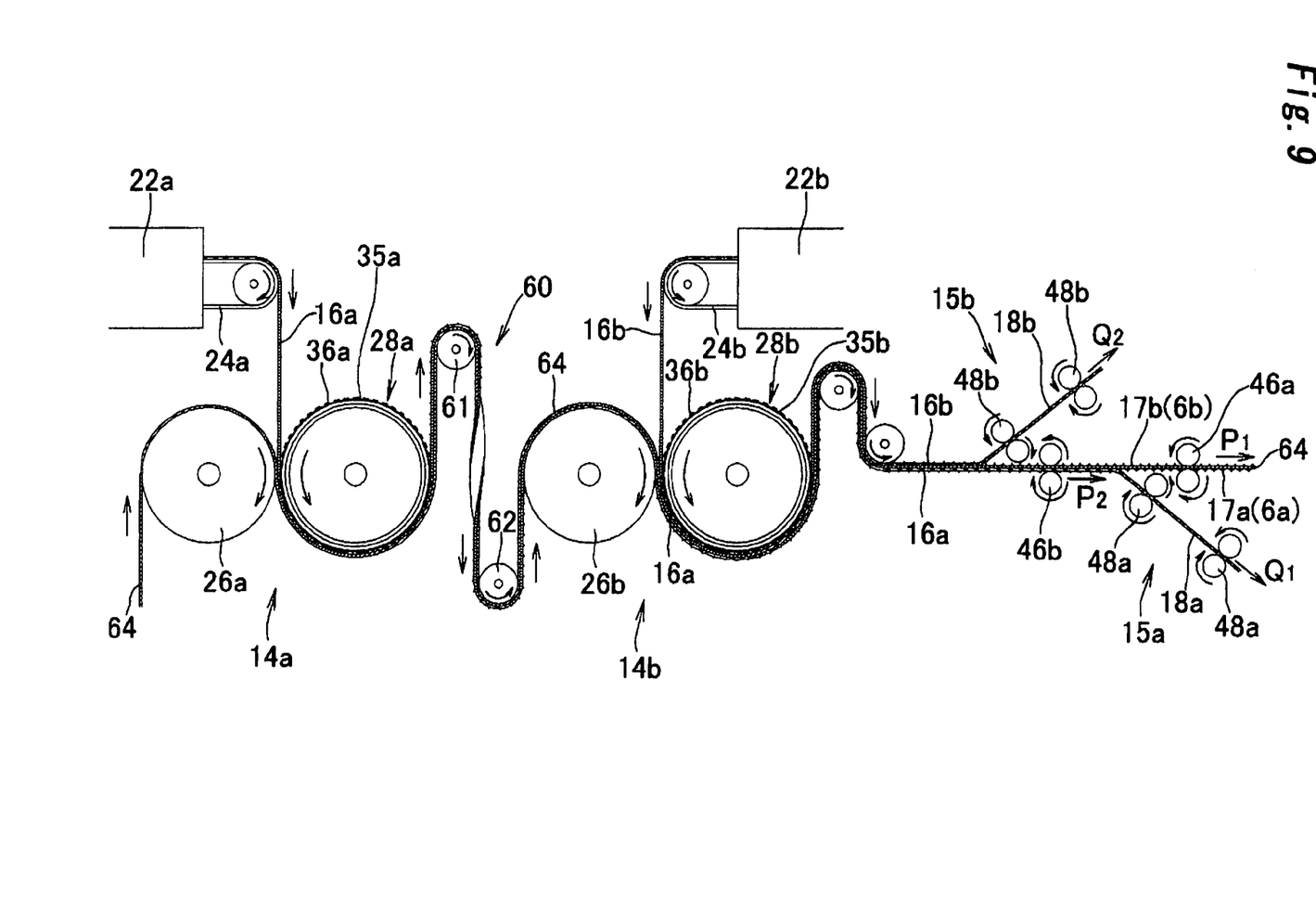
FIG. 9 is a diagram which shows a projections-seating base member manufacturing apparatus according to a third preferred embodiment.

FIG. 9 shows the third preferred embodiment of the present invention. In a method of manufacturing a projections-seating base member and an apparatus for manufacturing a projections-seating base member according to the third preferred embodiment, plural first projections 6a and second projections 6b are formed in a spaced arrangement respectively on a first and a second surfaces of a base member 64.

The manufacturing apparatus for manufacturing a projections-seating base member according to this preferred embodiment includes a first molding means 14a, which bonds a thermoplastic or thermosetting sheet-like molding material 16a to the first surface of the base member 64 and forms and shapes the first projections 6a from a molding material 17a which is a part of the molding material 16a and will be described later and a second molding means 14b which bonds a thermoplastic or thermosetting sheet-like molding material 16b to the second surface of the base member 64 and forms and shapes the second projections 6b from a molding material 17b which is a part of the molding material 16b and will be described later.

The first molding means 14a includes a first cylindrical mold roller 28a, which serves as a first metal mold and has a first cylindrical surface 35a, namely, a first reference surface, and the first plural projection-shaping die parts 36a projecting from the first cylindrical surface 35a, and a first cylindrical support roller 26a serving as a first support member which firmly presses, together with the first cylindrical mold roller 28a, the base member 64 and the molding material 16a under pressure. The first cylindrical support roller 26a is disposed opposed against the first cylindrical mold roller 28a.

The second molding means 14b includes a second cylindrical mold roller 28b, which serves as a second metal mold and has a second cylindrical surface 35b, namely, a second reference surface, and the second plural projection-shaping die parts 36b projecting from the second cylindrical surface 35b, and a second cylindrical support roller 26b serving as a second support member which firmly presses, together with the second cylindrical mold roller 28b, the base member 64 and the molding material 16b under pressure. The second cylindrical support roller 26b is disposed opposed against the second cylindrical mold roller 28b.

The first cylindrical mold roller 28a and the second cylindrical mold roller 28b have a similar structure to that of the cylindrical mold roller 28 according to the first preferred embodiment, and respectively have the first projection-shaping die parts 36a and the second projection-shaping die parts 36b having similar structures to that of the projection-shaping die parts 36 according to the first preferred embodiment. However, the first projection-shaping die parts 36a and the second projection-shaping die parts 36b may be different from each other in terms of the shape, the size and the height, and where the shape and the like of the first projection-shaping die parts 36a are different from those of the second projection-shaping die parts 36b, the shape, the size and the height of the first projections 6a and those of the second projections 6b may be different from each other.

While the first projection-shaping die parts 36a have a similar structure to that of the projection-shaping die parts 36 according to the first preferred embodiment and are therefore omitted in FIG. 9, the first projection-shaping die parts 36a include first hollow spaces which are shaped so as to fit with the profiles of the first projections 6a and first ring-like protruding sections which surround the first hollow spaces. The second projection-shaping die parts 36b similarly include second hollow spaces which are shaped so as to fit with the profiles of the second projections 6b and second ring-like protruding sections which surround the second hollow spaces.

The first hollow spaces and the second hollow spaces have a similar structure to that of the hollow spaces 38 according to the first preferred embodiment, and the first ring-like protruding sections and the second ring-like protruding sections have a similar structure to that of the ring-like protruding sections 42 according to the first preferred embodiment.

The second molding means 14b is disposed on the downstream side to the first molding means 14a along the transportation path, and a reversing means 60 which turns the base member 64 upside down is disposed between the first molding means 14a and the second molding means 14b. The reversing means 60 is formed by paired transportation rollers 61 and 62. The paired transportation rollers 61 and 62 are structured so as to transport the base member 64 while reversing the base member 64 between the transportation roller 61 which is on the upstream side of the transportation path and the transportation roller 62 which is on the downstream side.

The manufacturing apparatus for manufacturing a projections-seating base member according to this preferred embodiment further includes a first strip-off means 15a, which leaves the partial molding material 17a described above on the first surface of the base member 64 and strips off the molding material 18a which is exclusive of this partial molding material 17a, and a second strip-off means 15b which leaves the partial molding material 17b described above on the second surface of the base member 64 and strips off the molding material 18b which is exclusive of this partial molding material 17b.

The first strip-off means 15a and the second strip-off means 15b are disposed on the downstream side to the second molding means 14b along the transportation path. Further, the first strip-off means 15a is disposed on the downstream side for example to the second strip-off means 15b. The first strip-off means 15a however may be disposed on the upstream side to the second strip-off means 15b. Alternatively, the first strip-off means 15a may be disposed between the first molding means 14a and the second molding means 14b.

The first strip-off means 15a and the second strip-off means 15b have a similar structure to that of the strip-off means 15 according to the first preferred embodiment described above, and respectively include first means 46a, 46b and second means 48a, 48b.

In addition, the manufacturing apparatus for manufacturing a projections-seating base member according to this preferred embodiment includes a first heating furnace 22a and a first heating furnace conveyer 24a which heat up and feed the molding material 16a which is on the first surface of the base member 64 and a second heating furnace 22b and a second heating furnace conveyer 24b which heat up and feed the molding material 16b which is on the second surface of the base member 64.

The manufacturing method of manufacturing a projections-seating base member according to this preferred embodiment will now be described. The base member 64, after transported as it is wound around a part of the outer circumferences of the first cylindrical support roller 26a such that the first surface of the base member 64 is faced outside, is fed into between the first cylindrical mold roller 28a and the first cylindrical support roller 26a.

Meanwhile, the sheet-like molding material 16a which is the material of the first projections 6a, as it is heated and softened by the first heating furnace 22a, is transported toward the downstream side of the transportation path from the first heating furnace conveyer 24a, and fed into between the first cylindrical mold roller 28a and the first cylindrical support roller 26a. The molding material 16a is disposed on the first surface of the base member 64, and the first cylindrical mold roller 28a presses upon the molding material 16a which is nipped between the first cylindrical mold roller 28a and the first cylindrical support roller 26a.

At this stage, as in the first preferred embodiment, the first ring-like protruding sections at least press the molding material 16a, thus pressurized molding material 16a is bonded to the first surface of the base member 64, and the first projections 6a are formed and shaped from the molding material 16a opposed against the insides of the hollow spaces surrounded by the first ring-like protruding sections.

The base member 64 and the molding material 16a, as they are stacked one atop the other with the base member 64 is outside, are wound around a part of the outer circumferences of the cylindrical mold roller 28a and transported, and then fed to the reversing means 60.

The base member 64 and the molding material 16a, as they are stacked one atop the other with the base member 64 is inside, are wound around a part of the outer circumferences of the transportation roller 61 which is on the upstream side to the reversing means 60 and transported, twisted thereby turning the base member 64 upside down, and then fed to the transportation roller 62 which is on the downstream side to the reversing means 60. The base member 64 and the molding material 16a, as they are stacked one atop the other with the base member 64 is inside, are wound around a part of the outer circumferences of the transportation roller 62 which is on the downstream side to the reversing means 60 and transported, and then fed to the second molding means 14b. The base member 64 and the molding material 16a fed to the second molding means 14b, as they are stacked one atop the other with the base member 64 is outside, are wound around the outer circumferences of the second cylindrical support roller 26b and transported, and then fed into between the second cylindrical mold roller 28b and the first cylindrical support roller 26b.

The sheet-like molding material 16b which is the material of the second projections 6b, as it is heated and softened by the second heating furnace 22b, is transported toward the downstream side of the transportation path from the heating furnace conveyer 24b, and fed into between the second cylindrical mold roller 28b and the second cylindrical support roller 26b. This places the molding material 16b on the second surface of the base member 64, and makes the second cylindrical mold roller 28b press on these two which are held between the second cylindrical mold roller 28b and the second cylindrical support roller 26b.

At this stage, as in the first preferred embodiment, the second ring-like protruding sections at least press the molding material 16b, thus pressurized molding material 16b is bonded to the second surface of the base member 64, and the second projections 6b are formed and shaped from the molding material 16b opposed against the insides of the hollow spaces surrounded by the second ring-like protruding sections.

After this, the base member 64 and the molding materials 16a and 16b bonded to the first and the second surfaces of the base member 64 are transported further toward the downstream side of the transportation path and fed to the second strip-off means 15b.

As the base member 64 and the molding materials 16a and 16b are fed to the second strip-off means 15b, the first means 46b pulls the base member 64 and the molding material 16a laid over the first surface of the base member 64 toward a first direction $P_2$, while the second means 48b pulls the molding material 18b, which is exclusive of the molding material 17b opposed against the plural second projection-shaping die parts 36b on the second surface of the base member 64, toward a second direction $Q_2$. This leaves on the second surface of the base member 64 the molding material 17b, which is opposed against the plural second projection-shaping die parts 36b on the second surface of the base member 64, and strips off the molding material 18b which is exclusive of the molding material 17b opposed against the plural second projection-shaping die parts 36b.

The first means 46b of the second strip-off means 15b transports the base member 64 and the molding material 16a laid over the first surface of the base member 64 toward the downstream side of the transportation path and fed to the first strip-off means 15a. The first means 46a of the first strip-off means 15a pulls the base member 64 toward a first direction $P_1$, while the second means 48a pulls the molding material 18a, which is exclusive of the molding material 17a opposed against the plural first projection-shaping die parts 36a on the first surface of the base member 64, toward a second direction $Q_1$. This leaves on the first surface of the base member 64 the molding material 17a, which is opposed against the plural first projection-shaping die parts 36a on the first surface of the base member 64, and strips off the molding material 18*a* exclusive of the molding material 17*a* opposed against the plural first projection-shaping die parts 36*a*.

The other structures and effects according to the third preferred embodiment are similar to those according to the first preferred embodiment, and therefore, in FIG. 9, those members having similar functions to those according to the first preferred embodiment are denoted at the same reference symbols. In addition, while the foregoing has described the third preferred embodiment in relation to an instance that the first metal mold and the second metal mold are both formed by cylindrical rollers, the first metal mold and the second metal mold may be formed by the upper press section and the lower press section described in relation to the second preferred embodiment.

For instance, in the event that the first metal mold is formed by the upper press section and the second metal mold is formed by the lower press section, the plural first projection-shaping die parts 36*a* may be formed on the bottom surface of the upper press section, the plural second projection-shaping die parts 36*b* may be formed on the bottom surface of the lower press section, the press machine may be closed with the molding material 16*a* placed on the first surface, namely, the top surface of the base member 64 and the molding material 16*b* placed on the second surface, namely, the bottom surface of the base member 64, to thereby form the plural first projections 6*a* and the plural second projections 6*b* each in a spaced arrangement the first surface and the second surface of the base member 64, respectively. In this instance, it is necessary to locate the first projection-shaping die parts 36*a* and the second projection-shaping die parts 36*b* shifted from each other so as not to interfere with each other at the time of closing of the press machine.

EXAMPLES

To confirm the acoustic absorption capability and the antiskid capability of a floor mat manufactured by the manufacturing method according to the first preferred embodiment, samples were fabricated as Example 1, Comparative Example 1 and Comparative Example 2 and tested in the following manner.

In the sample according to Example 1, the mat base member was formed by a carpet layer and a non-woven fabric layer, and plural non-slip projections were bonded to the non-woven fabric layer. Further, the sample of Example 1 was fabricated by the manufacturing method according to the first preferred embodiment described above which required, after pressure bonding of a sheet-like molding material (having the thickness of 1.2 mm and the specific gravity of 1.4 g/cm$^3$) and non-woven fabric (having the thickness of 2 mm and the weight of 200 g/m$^2$) to each other and forming and shaping of the non-slip projections at the same time as pressure bonding, bonding a carpet (having the weight of 800 g/m$^2$ and the pile length of 8 mm) to the opposite surface of the non-woven fabric to the surface which has been bonded with the non-slip projections.

The sample according to Comparative Example 1 was fabricated by cutting the conventional product shown in FIG. 13 into an appropriate size, while the sample according to Comparative Example 2 was fabricated by cutting the conventional product shown in FIG. 14 into a proper size.

Figure 10:
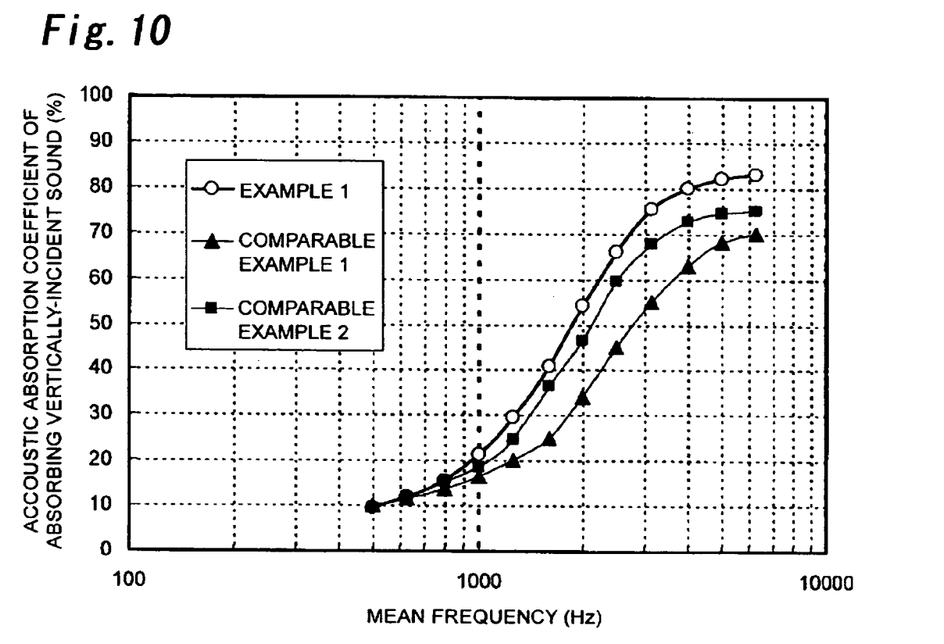
FIG. 10 is a graph of acoustic absorption coefficients of absorbing a vertically-incident sound measured on samples alone in an acoustic absorption capability test.
Figure 11:
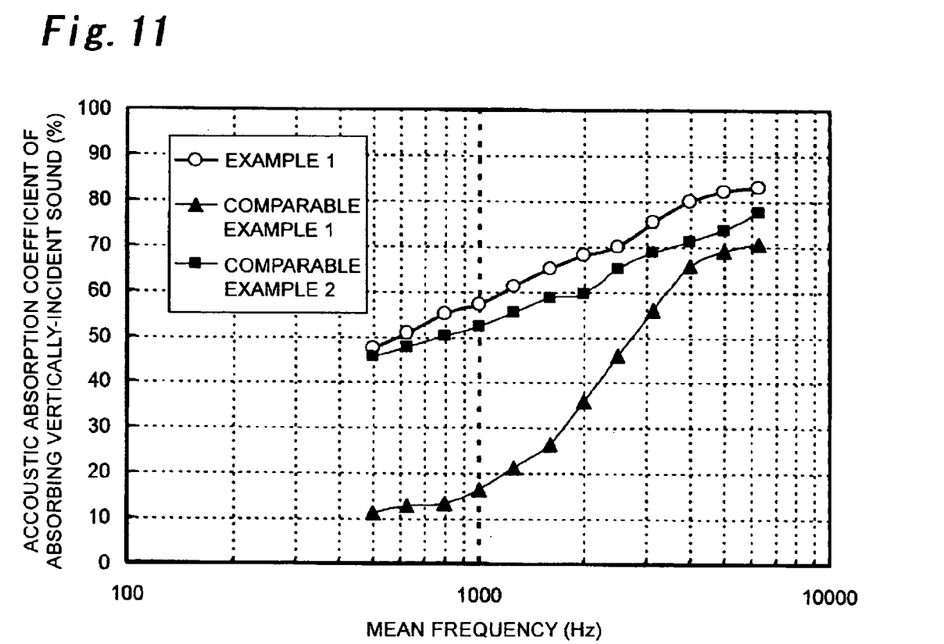
FIG. 11 is a graph which shows acoustic absorption coefficients of absorbing a vertically-incident sound measured on samples which are set on car flooring materials in an acoustic absorption capability test.

Acoustic Absorption Capability Test: FIG. 10 is a graph of acoustic absorption coefficients measured by a vertical incidence method on the samples alone of Example 1, Comparative Example 1 and Comparative Example 2. Meanwhile, FIG. 11 is a graph of acoustic absorption coefficients measured by the vertical incidence method on the samples of Example 1, Comparative Example 1 and Comparative Example 2 set on car flooring materials. The direction of incidence of a sound was set such that sounds would enter at the surfaces of the carpet layers of the car flooring materials, and measurement was conducted in accordance with JISA1405.

As shown in FIG. 10, measurements conducted on the samples alone showed no significant difference between the acoustic absorption coefficients of the samples according to Example 1, Comparative Example 1 and Comparative Example 2. However, as shown in FIG. 11, from measurements with the samples set on the car flooring materials, it was confirmed that the acoustic absorption coefficients of the samples according to Example 1 and Comparative Example 2 were remarkably higher than that of the sample according to Comparative Example 1.

In other words, for the sample according to Comparative Example 1, since the entire back surface of the mat base member was covered with a resin sheet, the resin sheet reflected a sound entering at the surface of the mat and the car flooring material was not able to exhibit effectively its acoustic absorption capability, whereas in the case of the samples according to Example 1 and Comparative Example 2, since reflection of sounds by the resin sheets like that occurring in Example 1 did not occur and the sounds were accordingly transmitted by the samples and reached the car flooring materials, the car flooring materials were able to exhibit effectively their acoustic absorption capabilities.

Figure 12:
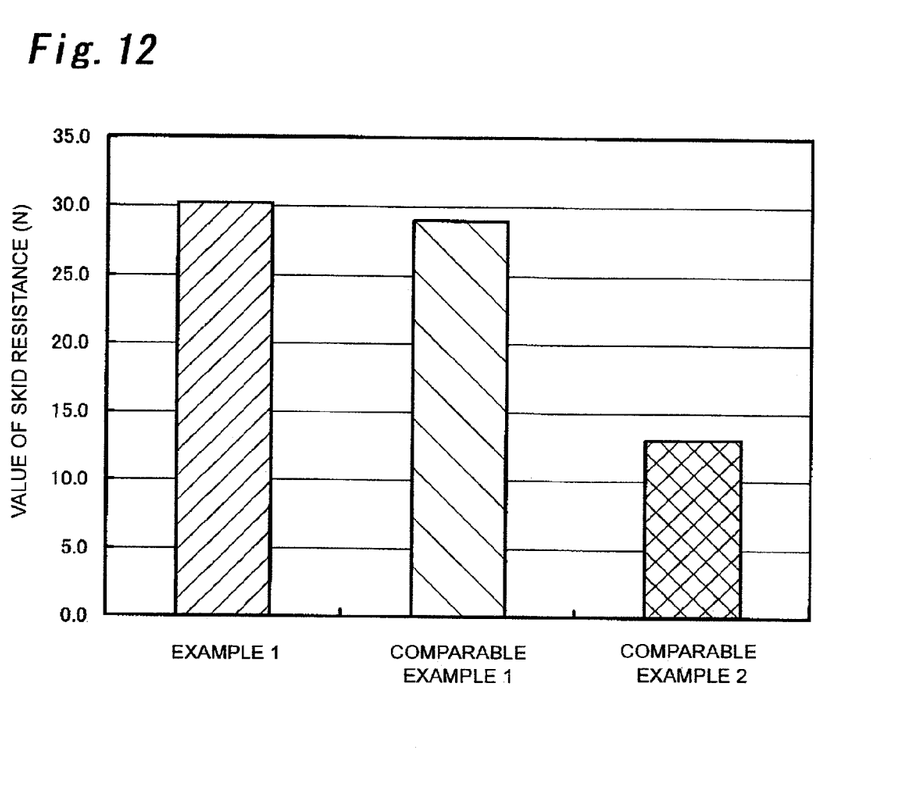
FIG. 12 is a graph which shows the values of skid resistance measured on test samples set on car flooring materials in an antiskid capability test.

Antiskid Capability Test: FIG. 12 is a graph of the values of skid resistance measured on the samples according to Example 1, Comparative Example 1 and Comparative Example 2. In the antiskid capability test, test samples cut into the size of 100×140 mm were prepared from the samples of Example 1, Comparative Example 1 and Comparative Example 2. With the respective test samples set on car flooring materials and each subjected to a load of 1 kgf (9.8 N), the test samples were pulled parallel to the surfaces of the car flooring materials at the speed of 100 mm/min and the values of skid resistance (N) were measured.

As shown in FIG. 12, it was confirmed that the sample according to Comparative Example 2 had the lowest value of skid resistance, whereas the samples according to Example 1 and Comparative Example 1 including the non-slip projections had the equally high values of skid resistance.

What is claimed is:

1. A method of manufacturing a projections-seating base member in which plural projections are formed in a spaced arrangement on a first surface or a second surface of a base member or on both said first surface and said second surface, said method comprising:
   preparing said base member;
   preparing a metal mold which comprises a reference surface and plural projection-shaping die parts, said plural projection-shaping die parts having ring-like protruding sections projecting from said reference surface and surrounding hollow spaces which are shaped to match with the profiles of said projections;
   placing a thermoplastic or thermosetting sheet-like molding material on said base member;
   pressing said metal mold against said molding material placed on said base member and pressurizing said molding material at least with said ring-like protruding sections without cutting said molding material, so as to bond portions of said molding material which are pressurized with said ring-like protruding sections to said base member, and so as to form and shape said projections from said molding material which is opposed against the insides of said hollow spaces surrounded by said ring-like protruding sections; and leaving on said base member said molding material which is opposed against said plural projection-shaping die parts and stripping off said molding material other than said molding material which is opposed against said plural projection-shaping die parts.

2. The method of manufacturing a projections-seating base member of claim 1, further comprising:

heating and accordingly softening said molding material before placing said molding material on said base member.

3. The method of manufacturing a projections-seating base member of claim 1, further comprising:

heating and accordingly softening said molding material after placing said molding material on said base member.

4. The method of manufacturing a projections-seating base member of claim 3, wherein said molding material is heated while being molded by said metal mold.

5. The method of manufacturing a projections-seating base member of claim 1, wherein said base member is made of a fiber material.

6. The method of manufacturing a projections-seating base member of claim 1, wherein said molding material is a resin or rubber.

7. The method of claim 1, wherein during said pressing operation said plural projection-shaping die parts are pressed only partially through said molding material.

8. The method of claim 1, wherein said pressing operation is performed such that said portions of said molding material which are pressurized with said ring-like protruding sections are not cut from portions of said molding material which are not pressurized with said ring-like protruding sections.

9. The method of claim 1, wherein said pressing operation is conducted with a cylindrical mold roller having said plural projection-shaping die parts disposed thereon, and wherein said stripping off said molding material is performed after said molding material leaves said cylindrical mold roller.

10. The method of claim 1, wherein said pressing operation is conducted with a cylindrical mold roller having said plural projection-shaping die parts disposed thereon, and wherein said projections have not been cut from a remainder of said molding material when said molding material leaves said cylindrical mold roller.

11. A method of manufacturing a projections-seating base member in which plural projections are formed in a spaced arrangement on a first surface or a second surface of a base member or on both said first surface and said second surface, said method comprising:

preparing said base member;

preparing a metal mold which comprises a reference surface and plural projection-shaping die parts, said plural projection-shaping die parts having ring-like protruding sections projecting from said reference surface and defining hollow spaces therein, said hollow spaces being shaped to form the profiles of said projections;

placing a thermoplastic or thermosetting sheet-like molding material on said base member;

bonding portions of said molding material to said base member by pressing said portions of said molding material with said ring-like protruding sections, wherein said projections are formed and shaped in said hollow spaces of said plural projection-shaping die parts by said pressing; and stripping off portions of said molding material which are not bonded to said base member by said bonding operation such that said projections which have been formed and bonded to said base member by said pressing remain on said base member, wherein said bonding operation is performed such that said projections are not cut from said portions of said molding material which are not bonded to said base member.

12. The method of claim 11, wherein said projections remain connected by said molding material to said portions of said molding material which are not bonded to said base member until said stripping operation.

13. The method of claim 11, further comprising:

heating said molding material so as to soften said molding material before placing said molding material on said base member.

14. The method of claim 11, further comprising:

heating said molding material so to soften said molding material after placing said molding material on said base member.

15. The method of claim 14, wherein said molding material is heated while being molded by said metal mold.

16. The method of claim 11, wherein said base member is made of a fiber material.

17. The method of claim 11, wherein said molding material is a resin or rubber.

18. The method of claim 11, wherein during said pressing operation said plural projection-shaping die parts are pressed only partially through said molding material.

19. The method of claim 11, wherein said bonding operation is conducted with a cylindrical mold roller having said plural projection-shaping die parts disposed thereon, and wherein said stripping off operation is performed after said molding material leaves said cylindrical mold roller.

20. The method of claim 11, wherein said bonding operation is conducted with a cylindrical mold roller having said plural projection-shaping die parts disposed thereon, and wherein said projections have not been cut from a remainder of said molding material when said molding material leaves said cylindrical mold roller.

\* \* \* \* \*